United States Patent [19]

Peterson et al.

[11] 4,122,512
[45] Oct. 24, 1978

[54] SUPERCONDUCTIVE ENERGY STORAGE FOR POWER SYSTEMS

[75] Inventors: Harold A. Peterson; Roger W. Boom, both of Madison, Wis.

[73] Assignee: Wisconsin Alumni Research Foundation, Madison, Wis.

[21] Appl. No.: 511,210

[22] Filed: Oct. 2, 1974

Related U.S. Application Data

[63] Continuation-in-part of Ser. No. 350,794, Apr. 13, 1973, abandoned.

[51] Int. Cl.$^2$ ............................................... H02J 15/00
[52] U.S. Cl. ........................................ 363/14; 307/22; 323/44 F; 363/129; 363/137
[58] Field of Search ................................. 307/19–22, 307/306; 321/8 CD, 45 R, 45 ER; 323/44 F; 363/14, 129, 137

[56] References Cited

U.S. PATENT DOCUMENTS

| | | | |
|---|---|---|---|
| 2,194,822 | 3/1940 | Dannheiser | 307/22 |
| 3,339,080 | 8/1967 | Howald | 321/45 R |
| 3,479,569 | 11/1969 | Prost et al. | 307/306 X |
| 3,611,114 | 10/1971 | Sole | 321/8 CD |

OTHER PUBLICATIONS

Low Temperatures and Electric Power, Meeting of Commission I of the I.I.R. London (U.K.), Pergamon Press, 1970, pp. 411–440.
Hassenzahl et al., "Magnetic Energy Storage and Its Application in Electric Power Systems", IEEE International Conference Technical Papers, Mar. 27, 1973, pp. 1–13.
Hassenzahl, "Will Superconducting Magnetic Energy Storage Be Used On Electric Utility Systems?", IEEE Transactions on Magnetics, vol. Mag-11, No. 2, Mar. 1975, pp. 482–488.

Cryogenics, vol. 9, No. 4, Aug. 1969, pp. 296, 297.

Primary Examiner—A. D. Pellinen
Attorney, Agent, or Firm—Burmeister, York, Palmatier, Hamby & Jones

[57] ABSTRACT

Energy derived from an alternating current power system is stored in a superconducting magnet or inductor. The transfer of the energy is reversible so that the energy stored in the superconducting magnet can be returned to the alternating current power system. Generally, the energy is stored when surplus energy is available, due to low demand. The energy stored in the superconducting magnet may be returned to the power system when demand is high. High efficiency in the storage and return of the energy is achieved. A reversible converter is provided between the alternating current system and the superconducting magnet so that the magnet is supplied with direct current when energy is being stored. The converter may be adjusted so as to convert direct current into alternating current when it is desired to return the stored energy to the power system. The converter may comprise a rectifier-inverter system utilizing controlled rectifiers and a variable firing angle controller which is adjustable to control the operating mode of the rectifier-inverter system. The controller may be adjusted so that the system functions as a rectifier unit to convert the alternating current to direct current for the storage of energy in the superconducting magnet. The controller may be adjusted to a different firing angle so that the system functions as an inverter to convert direct current from the magnet into alternating current which is returned to the power system. The energy storage system can have lower losses than systems of prior types, such as pumped hydro-storage systems. The superconductive magnet system also has the ability to damp electro-mechanical oscillations in the power system.

6 Claims, 4 Drawing Figures

SUPERCONDUCTIVE ENERGY STORAGE FOR POWER SYSTEMS

This application is a continuation-in-part of our copending application Ser. No. 350,794, filed Apr. 13, 1973 and now abandoned.

This invention relates to the reversible storage of energy derived from a conventional alternating current power system. By virtue of the storage system of the present invention, energy can be withdrawn from the power system and stored during periods when surplus energy is available, due to low demand upon the power system. The stored energy can be returned to the power system when the demand is high. In this way, the effective capacity and the stability of the power system can be increased.

One object of the present invention is to provide a new and improved energy storage system whereby the electrical energy derived from a power system can be stored in the form of a magnetic field, rather than in the form of mechanical or chemical energy, as has been done previously.

A further object is to provide a new and improved energy storage system which is highly efficient and which may be constructed to have high energy storage capacity and high power capability so that the stored energy can be returned to the system at a high rate.

In the past, energy derived from electrical power systems has been stored chemically in storage batteries, and also mechanically in pumped hydro-storage systems. In such hydro-storage systems, electrical energy is employed to pump water into a reservoir at a higher elevation. The stored water at a considerable head thus represents stored mechanical energy, which can be reconverted into electrical energy by using the stored water to operate hydro-electric generators, connected to the power system. Such hydro-storage systems have fairly low efficiency, generally in the neighborhood of 65%.

In the energy storage system of the present invention, energy derived from a conventional alternating current power system is stored in a superconductive magnet or inductor. The energy is stored in the magnetic field which is produced by the superconductive magnet. The magnetic energy can be converted into electrical energy and returned to the power system, as needed.

The energy storage system of the present invention preferably employs a reversible converter for converting the alternating current from the power system into direct current for energizing the superconductive magnet. Over a period of time, the direct current through the winding of the magnet is built up to a high level. The winding of the magnet utilizes superconductive material so that current through the superconductive material does not produce any energy loss. When it is desired to return the stored energy to the power system, the operating mode of the converter is reversed so that the direct current through the winding of the superconductive magnet is converted into alternating current which is returned to the power system.

The converter preferably utilizes a rectifier-inverter system having a plurality of controlled rectifiers or valves, together with a variable firing angle controller. By changing the phase angles of the firing signals which are supplied to the controlled rectifiers, the rectifier-inverter system can be changed from a rectifier mode, in which the alternating current is converted to direct current, and a rectifier-inverter mode, in which the direct current is converted to alternating current. A refrigeration system is provided to maintain the superconductive winding of the magnet at an extremely low temperature, such that the winding material will exhibit superconductivity. Due to the use of superconductive material in the winding of the magnet, the power losses of the system are kept very low, so that high efficiency is achieved in the storage of energy and its return to the power system. The superconductive magnet system has the ability to damp electromagnetic oscillations in the power system, so that the stability of the power system is improved.

Energy storage systems using superconductive magnets can be built with extremely high energy storage capacity, power handling capability, and efficiency. Greater efficiency can be achieved than is possible in pumped hydro-storage systems.

Further objects, advantages and features of the present invention will appear from the following description taken with the accompanying drawings, in which.

Figure 1:
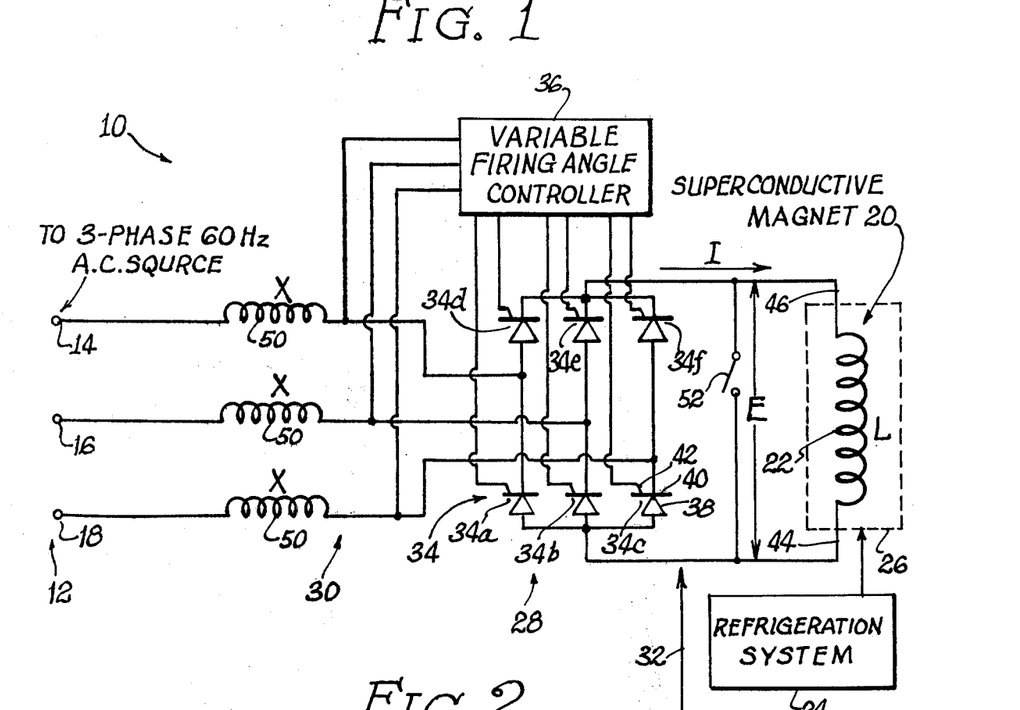
FIG. 1 is a schematic circuit diagram of an energy storage system to be described as an illustrative embodiment of the present invention.

As just indicated, FIG. 1 illustrates an energy storage system or device 10, adapted to derive electrical energy from a conventional alternating current source, illustrated as a three-phase power system 12, represented by 3 power lines, 14, 16 and 18. The energy is stored in the form of the magnetic field produced by a superconductive magnet or inductor 20 having a winding 22 made of superconductive material. The amount of superconductive material in the winding 22 is sufficient to carry the desired current while maintaining superconductivity. Any material which exhibits the superconductive effect may be employed. As is well known, the electrical resistance of the superconductive material is zero, so that the current flow through the superconductive winding material does not produce any power loss. It is this factor which makes it possible to store energy and return it to the electrical system with high efficiency.

To achieve the superconductive effect, it is necessary to cool the winding 22 of the magnet 20 to an extremely low temperature, only a few degrees above absolute zero, at which the superconductive winding material exhibits the property of superconductivity. The temperatures below which various materials exhibit superconductivity are well known to those skilled in the art. The magnet winding 22 must be maintained below the critical temperature for superconductivity, at all times when the magnet 20 is in use to store energy. For this purpose, the superconductive magnet 20 is provided with a refrigeration system 24, which includes a well insulated dewar 26 around the magnet winding 22. The refrigeration system 24 generally utilizes liquid helium as the refrigerant. To achieve the desired energy storage capacity, the superconductive magnet 20 may be of very large dimensions. The winding 22 may comprise any suitable type of coil or coils, including a solenoid or toroidal coil, for example.

To store energy in the superconductive magnet 20, a direct current is caused to flow along the superconductive winding 22. The current in the winding 22 produces a magnetic field which contains the stored energy.

In order to utilize the direct current magnet 20 with the alternating current power system 12 a reversible converter 28 is provided between the power system 12 and the magnet 20. The converter 28 is reversible between charging and discharging modes. In the charging or storage mode, the converter 28 changes the alternating current into direct current which is utilized to build up the current in the magnet winding 22. In the discharge mode the converter 28 changes the direct current from the magnet 20 into alternating current, which is returned to the power system 12.

Thus, the reversible converter 28 has an alternating current interface 30, for connection to the alternating current power system 12 and a direct current interface 32, for connection with the magnet winding 22.

The reversible converter 28 preferably takes the form of a rectifier-inverter system, utilizing a plurality of controlled rectifiers or valves 34, together with control means, which may be in the form of variable firing angle controller 36. Each of the illustrated rectifiers 34 is of the solid state type and may comprise a thyristor having two polarized main electrodes 38 and 40 and a control electrode 42. Preferably, there are six of the controlled rectifiers 34, connected in a bridge circuit between the alternating current interface 30 and the direct current interface 32. For convenience the individual rectifiers 34 are designated 34 a, b, c, d, e, and f. It will be seen that the magnet winding has end leads 44 and 46 which also constitute the connecting lines of the direct current interface 32. The rectifiers 34 a, b and c are connected between the lead 44 and the alternating current lines 14, 16 and 18 respectively. As shown, they are polarized to conduct current in that direction. The rectifiers 34 d, e and f are connected from the alternating currenting lines 14, 16 and 18, respectively, to the other direct current lead 46. Additional flexibility may be achieved by connecting two or more bridges in series.

The control electrodes 42 of the rectifiers 34 a–f are connected to the controller 36 which supplies firing signals to the control electrodes. The controller 36 is also connected to the alternating current supply lines 14, 16 and 18, so that the timing of the firing signals can be controlled with respect to the phases of the three phase system. The operator can adjust the controller 36 so as to vary the firing angles of the signals supplied to the rectifiers 34 a–f. It will be understood that for one set of firing angles the rectifiers 34 a–f function as rectifiers to convert the three phase alternating current into direct current which is supplied to the superconductive magnet 20. Due to the high inductance of the magnet 20 the current through the magnet builds up gradually over a period of time. With the increased current the stored energy also builds up.

When it is desired to return energy to the alternating current power system 12, the operator adjusts the controller 36 so as to change the firing angles to a new set of values which cause the rectifiers 34 a–f to act as inverters, to convert the direct current from the magnet 20 into alternating current, which is supplied to the three phase power lines 14, 16 and 18.

The converter 28 is similar to the rectifier-inverter systems which have been employed in high voltage transmission lines to convert direct current to alternating current and vice versa. In most power systems, the electrical power is generated in the form of three phase alternating current. Moreover, the power is generally utilized in the form of three phase alternating current. However, there are advantages in transmitting the power over long distances in the form of direct current. Such rectifier-inverter systems have been used in such power transmission systems to convert the three phase alternating current into direct current for power transmission, and to convert the direct current into three phase alternating current at the receiving end of the transmission lines.

In FIG. 1, inductance elements 50 are shown in series with the alternating current power lines 14 and 16. These elements 50 represent the commutating reactances X of the alternating current supply 12. In some cases, these reactances may be simply the reactance of the transmission lines which are involved in the alternating current supply 12. In other cases, the commutating reactances may be increased by inserting reactance elements with the alternating current supply lines 14, 16 and 18.

In the typical operation of the energy storage system 10, the controlled rectifiers 34 a–f are operated in their rectifier modes during the night time hours when the demand for electrical energy is low so that surplus energy is available for storage in the superconductive magnet 20. The rectifiers 34 a–f develop a considerable voltage E across the superconductive magnet 20, but the inductance L of the magnet winding 22 is high, so that the magnet current I builds up gradually over a period of hours. There is no loss of energy due to the flow of the magnet current through the superconductive material in the magnet coil 22.

Generally, the stored energy is returned to the alternating current system 12 when the demand is high during the day time hours. Thus, the energy storage system 10 augments the generating capacity of the alternating current system 12. The controller 36 is adjusted to producing firing angles which cause the rectifiers 34 a–f to function in their inverter modes, so that the direct current from the magnet 20 is converted into three phase alternating current, which is returned to the power system 12. During the discharge of the energy storage system 10, the magnetic field of the superconductive magnet 20 gradually collapses, which has the effect of maintaining the magnetic current at a gradually decreasing value. In the normal duty cycle, the superconductive magnet 20 is only partially and not totally discharged, so that there is still a considerable current flow in the magnet winding 22 when the charging of the magnet is resumed. Referring to FIG. 1 the storage inductance to be "charged" is the only load on the rectifier-inverter. The voltage E is given by an equation of the form $$E = E_{do} \cos A - IX = I \frac{dI}{dt} \qquad (1)$$

where $E_{do}$ is the voltage across the bridge with A = zero when the current I is equal to zero, and X is the commutating reactance. Clearly for a given set of constants, the delay angle A (which can be varied from 0° to approximately 180°) is the key to the control rate of charge, including both positive and negative charge, the latter corresponding to discharging the inductance L. Thus, we have inherently continuous control of the reversible process corresponding to the pumped hydrosystem throughout the motoring and generating portions of the cycle.

For example, if L is 3440 henries and E is held at 8000 volts for $4.3 \times 10^4$ seconds or 12 hours, then 4800 MWhr (megawatt hours) can be stored at $10^5$ amperes at an average rate of 400 MW (megawatts). Note that the thyristor firing angles can be varied so that zero voltage is impressed across the storage inductor. Thus at full charge the storage current which flows in the inductor, line and generator can be held constant. Alternatively, the inductor can be shorted with an external switch 52 or an internal superconducting switch and disconnected from the system when fully charged.

Energy stored in the superconducting magnet is returnable to the AC system under smooth continuous control. Distortions to the voltage waveform of the AC system would result as is well known. It will be recognized that such converter systems with variable firing angles are essentially no different from those used in modern high voltage multi-bridge direct current (HVDC) power transmission. Appropriately designed filters can be used to reduce harmonics to acceptable levels compatible with quality power standards.

The inefficiencies encountered are those in the conventional AC system, in the converter bridge, and the refrigeration required to balance electrical, magnetic, mechanical, and thermal losses into the cryogenic enclosure. Preliminary loss estimates indicate that, in total, these losses are less than the standard 1kW (kilowatt) loss for 2kW recovered which is usually realized for hydrostorage installations.

As an example, let us list the losses for a 10,000 MWhr unit with a 400 MW reversible rating. For convenience it is assumed that the unit is never discharged to less than 5200 MWhr. Thus, only half of the energy or 400 MW for 12 hrs is exchanged with the power system. All losses into the cryogenic enclosure have been translated to an ambient temperature equivalent loss by using a conservative refrigeration factor of 500 watts per watt. As an ambient loss, these losses are then quoted below in terms of percent of stored energy or of reversible power, whichever is appropriate. The losses in the bridge and conventional AC system are estimated as about 2 percent, 8 MW or 192 MWhr for a 24 hr. period. We estimate the magnetic hysteresis loss at 1 percent or 50 MWhr per day. The loss associated with leads is taken as ¼ percent, 1 MW or 24 MWhr per day which allows currents up to $2 \times 10^6$ amperes in total through the thermal barrier into the various modules. Thermal radiation losses through the structure and superinsulation need not exceed 1 percent, 4 MW or 96 MWhr. The total loss during a 24 hr. period is 387 MWhr for 4800 MWhr delivered, or 3 percent of the delivered energy and 4 percent of the total stored energy. In contrast, hydrostorage would deliver 4800 MWhr with a 2400 MWhr loss or 50 percent loss compared to the delivered energy.

The anelastic or mechanical hysteresis loss into the cryogenic region, given above as about ½ percent, was estimated as follows. Each cycle a strain energy $s_w^2/2Y$ per unit volume is absorbed by the structure where Y is the modulus of elasticity and $s_w$ is the working stress. This represents a fraction $s_w/2Y$ of the total electromagnetic stored energy which approaches 0.1 percent if the structure has been minimized. With a refrigeration penalty of 500 watts/watt we have therefore assumed an anelasticity of $10^{-2}$, which is perhaps reasonable, if arriving at ½ percent loss.

Additional advantages for this system are the flexibility of control and speed of response which are helpful from a transient stability point of view. Electromechanical oscillations can be damped effectively by proper design of the control system. Computer studies reveal that this damping capability even without superconductivity at cryogenic or ambient temperature is useful in smaller sizes when energy storage in large amounts is not the primary objective.

Figure 2:
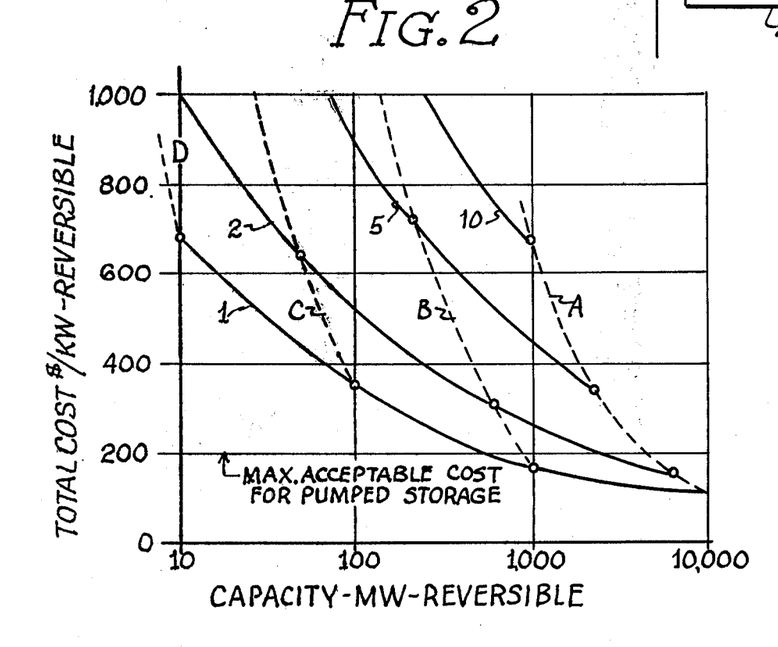
FIG. 2 is a set of graphs illustrating the estimated cost of the energy storage system, as a function of the capacity of the system.

FIG. 2 is a set of graphs showing superconductive energy storage costs vs. reversible capacity. The letters on the dashed curves are for the following maximum stored energy levels: A — 10,000; B — 1,000; C — 100; and D — 10 MWhr. The numbers on the solid curves represent hours for complete discharge at the installed reversible capacity rating. The converter equipment is estimated at a cost of $40/kW; the magnet superconductor at $60/kgram; and the magnet cost at 3 times the cost of the superconductor.

It is in the larger sizes, in terms of reversible power capability and maximum energy storage capability, that the energy storage system of the present invention compares favorably economically with conventional pumped hydrostorage. FIG. 2 shows that the estimated cost of sizes in the reversible range from 1,000 to 10,000 MW are below $200/kW reversible for energy storage capabilities in the 1,000 to 10,000 MWhr range and with a suitable daily load cycle. Note that the cost for large sizes approaches the cost of ac/dc conversion equipment and is correspondingly less sensitive to magnet costs.

It is advantageous to evaluate superconductive magnet coils of various types, including Brooks coils, thin wall solenoids and thin wall toroids, as to their utilization of superconductor material. The Brooks coil is a specially shaped solenoid which is more like a dipole with outer diameter/inner diameter = 2 and length/inner diameter = ½. Such a coil will ordinarily provide the maximum inductance for a given length wire. A figure of merit Q/M, energy stored/superconductor mass, can be established for each configuration. The figures of merit in joules/gram for the toroid, the solenoid, and the Brooks coil are $(1.35, 2.38, 2.38) 10^{-9} ur/d$ respectively, where $u$ is the superconductor pinning strength Hj in gauss-amp/cm², $d$ is the superconductor density in grams/cm³, and $r$ in cm is the inner radius of the solenoids and the minor radius of the toroid. In this case the major radius R of the toroid is chosen equal to twice the minor radius since the figure of merit is a maximum near R/r = 2. The solenoid was chosen to use the same amount of material as in the toroid with the same field and radius which gives a solenoid length of $2\pi r$. The pinning strength $u$ is approximately constant for limited field regions and is typically $10^9$ to $10^{10}$.

It is seen that for a given amount of superconductor the solenoid will store 1.77 times the energy in a toroid. It appears that a Brooks coil and the above selected solenoid are equally efficient. However, for a given energy, the long solenoid will have a smaller radius and therefore a lower figure of merit. Taking 10,000 MWhr at 100 kilogauss as an example Q/M (Brooks coil) is 10.7 $(10^{-6}) u/d$ for r = 4520 cm (148 feet) while Q/M (solenoid) is 8.78 $(10^{-6}) u/d$ for r = 3640 cm (119 feet). In order to limit the peak field, Brooks coils must be constructed with very low current densities; the above 10,000 MWhr example uses only 39.5 A/cm².

Consideration should also be given to structural and cryogenic optimization. It known that the minimum structural mass required to hold together a magent system is proportional to the stored energy $$M \geq \frac{d_s Q_m}{S_w} \quad (2)$$

where $d_s$ is the structure density, $S_w$ is the working stress, and $Q_m$ is the total magnetic energy. If all the structural elements are in tension the equality holds, if some of the structure is in compression then the mass is greater than the lower limit shown in equation (2).

Taking a solenoid as an example we assume that the winding can be treated as a solid cylinder. By making the approximation that distributed magnetic forces can be replaced by an internal pressure $p = H^2/8\pi$ we get:

$$\frac{t}{r} = \sqrt{\frac{S_w + P}{S_w - P}} - 1 \quad (3)$$

where $t$ is the winding thickness and $r$ the inner radius. In the limit of small $P/S_w$ the mass calculated for equation (3) is twice that predicted by equation (2). As the windings become thicker, more and more unnecessary structure is used. Some representative values of the extrastructure compared to a thin wall in percent are 10, 15, 23, 32, and 48 for $P/S_w = 0.1, 0.2, 0.3, 0.4,$ and 0.5 respectively. The same general principle can be shown for the toroid but not in simple analytical form. In addition a toroid requires central structure in compression which leads to structural inefficiencies. There is no optimum size for structural reasons; good design approaches a constant mass per energy unit independent of size. Regarding the selection of the field, however, $P/S_w$ should be as small as possible consistent with other requirements.

Cryogenic losses through the insulation modify the above tendency towards larger structures with lower magnetic fields. The loss through 25 cm of superinsulation is about 7.5 microwatts /cm². Considering toroids with $r/R = \frac{1}{2}$ this loss at room temperature amounts to $0.3r^2$ watts, where $r$ is in cm. The energy stored in the toroids is $4.25 (10^{-8})r^3 H_m^2$ joules where $H_m$ is the maximum field in gauss. Setting this loss at $1\frac{1}{2}$ percent, for example, defines a 100 kilogauss toroid with $r = 4400$ cm and $R = 8800$ cm. As to details of the superconductive magnet 20, it is advantageous to employ a composite conductor of copper and the superconductor in the winding 22 of the magnet.

The stress level for the copper in the copper-superconductor composite conductor should be held below the 12,000 psi yield point for oxygen free high conductivity copper (OFHC copper). There are at least two good reasons for this choice: (1) the mechanical hysteresis mentioned earlier would be increased as the material yields; and (2) the electrical resistance of OFHC copper continues to increase the cold work which could take place once per day as energy is cycled out and in. The stress picture can be improved by interwinding strips of stainless steel or some other high strength material with the copper - superconductor winding. Since Young's modulus for stainless steel is twice that for copper, it is thereby possible to increase the working stress up to a maximum of 24,000 psi. With a 2:1 copper to steel ratio, an average stress level of 16,000 psi can be achieved without exceeding 12,000 psi in the copper.

The superconductor filaments should be small enough so that current sharing can take place and twisted to reduce magnetization currents. The copper should be subdivided into enough turns so that sufficient surface cooling for a total thermal stability is possible.

In general the stress requirements are more severe than are the electrical stability requirements although one can reduce the margins for stability by building a simpler magnet with more steel, less copper, and fewer turns. This achieves $S_2 = 24,000$ psi and eventually could reach the thermal stability limit as well.

Energy storage by superconductive inductors is believed to be highly advantageous for power systems. The toroidal configuration is believed to be satisfactory because its external field is zero. Polygonally oriented solenoids are also believed to be suitable. The optimization of superconductor material does not appear to be critical because of the overwhelming requirements for structure. All figures of merit show clearly that large sizes are more efficient than small sizes, that the pinning strength u is the important superconductor parameter, and that low field units would be equally satisfactory if the cryogenic losses could be limited. Computer studies show that by proper design of the control system, effective damping of system electro-mechanical oscillations can be achieved.

Any suitable superconductive material may be employed in the winding of the superconductive magnet. Examples of suitable superconductive materials are niobium, tin, vanadium, titanium, gallium and alloys and compounds of such metals.

As previously indicated, the converter 28 is similar to the rectifier-inverter systems which have been employed in high voltage transmission lines to convert direct current to alternating current and vice versa. Additional details of such rectifier-inverter systems will be found in the book entitled, "Direct Current Transmission" by Edward Wilson Kimbark, published by Wiley in 1971, particularly Chapter 5, entitled "Control", pages 148-183.

Figure 3:
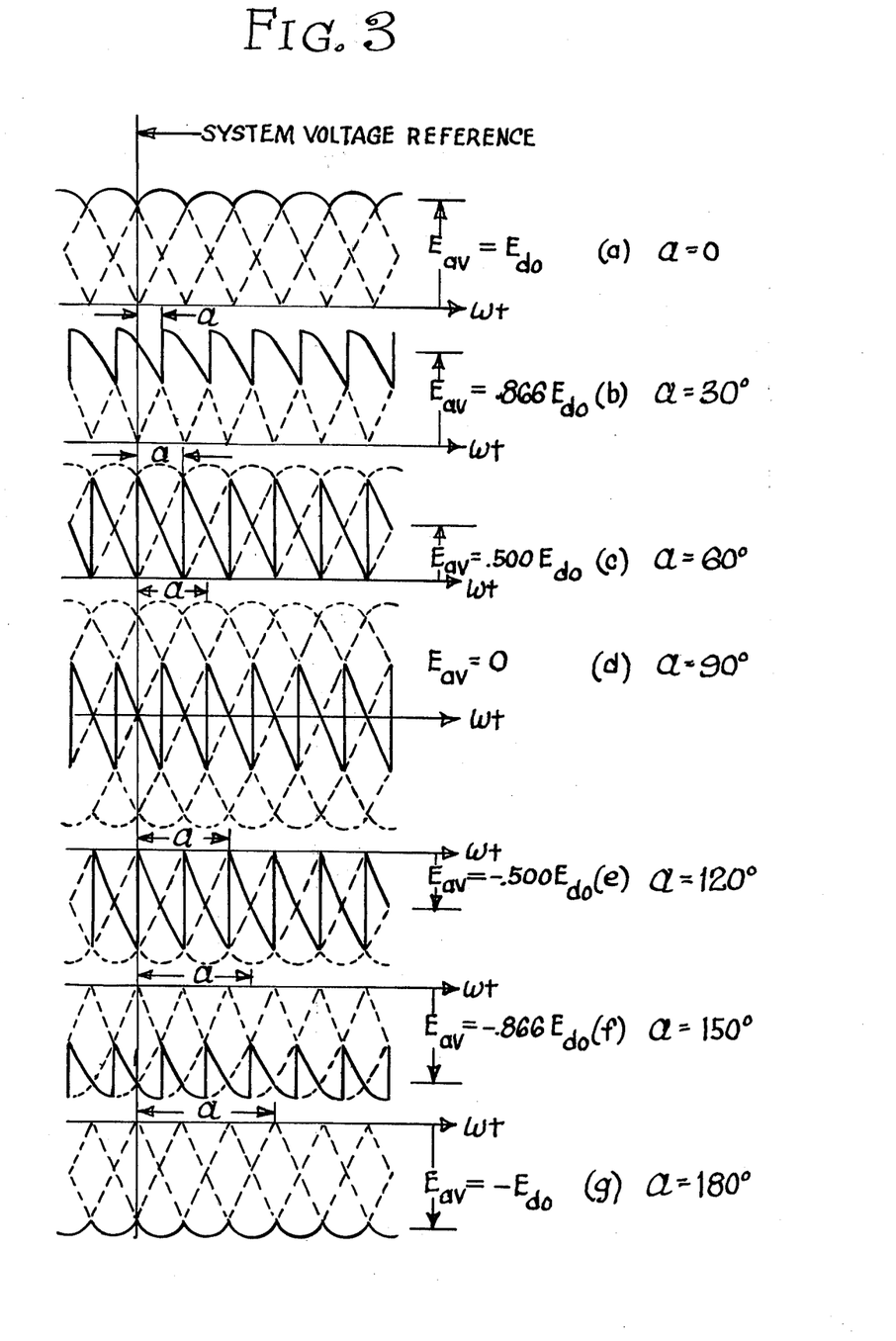
FIGS. 3 and 4 are wave form diagrams illustrating the operation of the system shown in FIG. 1.
Figure 4:
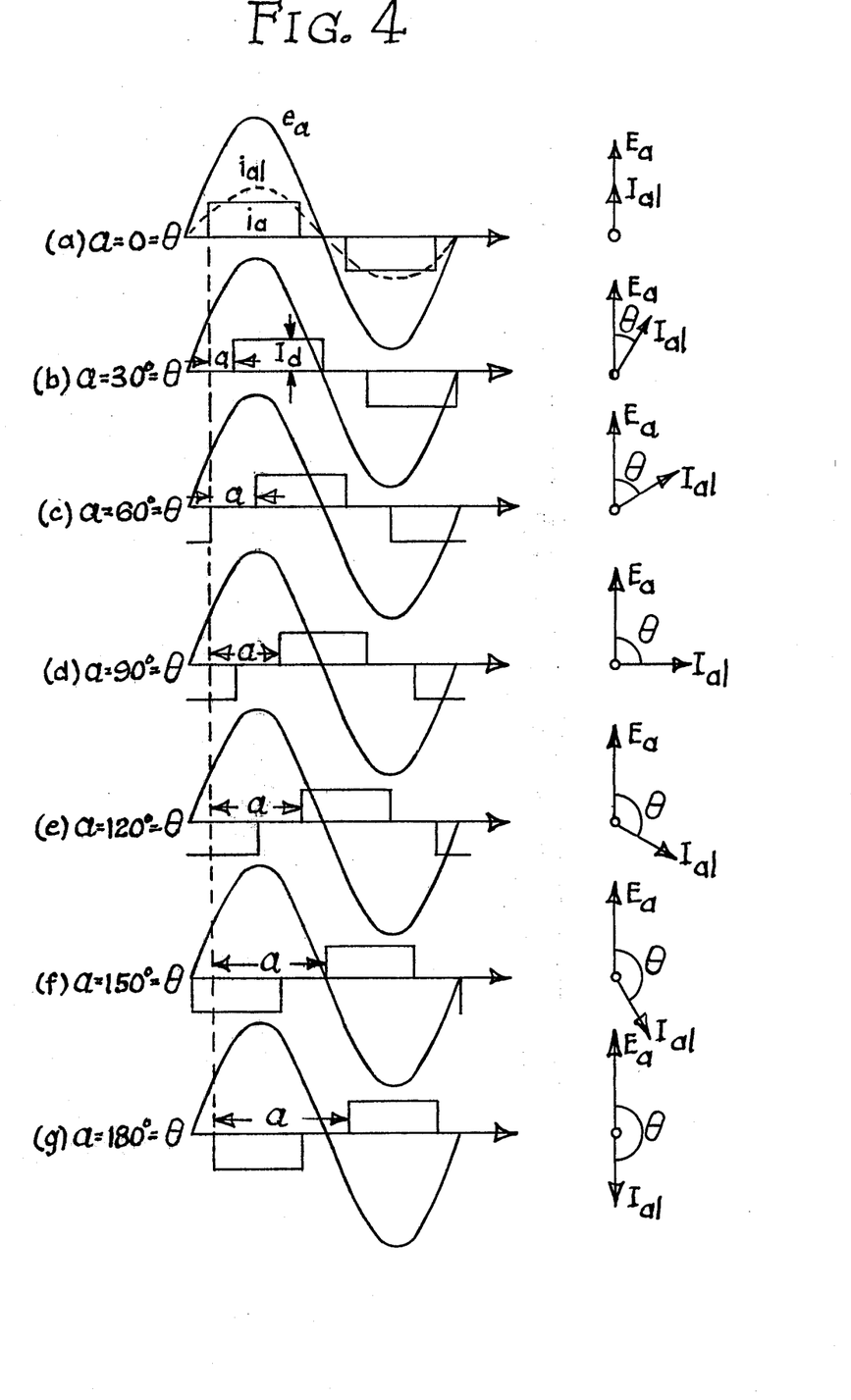

FIGS. 3 and 4 illustrate the operation of the AC/DC reversible power converter 28.

The wave form diagrams of FIG. 3 show the instantaneous output voltage of the six-pulse bridge converter 28 with the ignition delay angle $\alpha$ but no overlap. The average output voltage is also shown. The diagrams of FIG. 4 show the AC system terminal phase displacement angle $\theta$ as determined by the ignition delay angle $\alpha$.

The power converter interface between the three phase power system and the superconductive energy storage inductor (SESI) often referred to as a Graetz bridge, is shown in FIG. 1. The six valves of FIG. 1 are SCRs or thyristors which can be turned on or "fired" at any angle $\alpha$. If $\alpha = 0$, The valves operate as diodes. The bridge output voltage shown by the heavy unbroken line is a unidirectional series of pulses as shown in FIG. 3($a$). There are six "pulses" of voltage corresponding to the six "commutations" of current among the six valves for each cycle of the 60 Hz power system source. For all output voltages of FIG. 3, it is assumed that $I_d = 0$ and hence there is no commutation overlap interval or angle. $\alpha = 90°$ and becomes negative thereafter so that we may write $$E_d = E_{av} = E_{do} \cos \alpha \text{ and } P_d = E_d I_d = E_{do} I_d \cos \alpha \quad (1)$$

Since the bridge current $I_d$ is not reversible, it follows that the bridge output power $P_d$ is uniquely a function of $\cos \alpha$ which can be positive or negative.

Viewed from the power system side of the converter, varying α changes the power factor, the angle by which the ac voltage of one phase of the power system leads the corresponding fundamental frequency component of ac line current, see FIG. 4. Since there are three phases, the power from the power system is $P_{ac} = 3E_a I_{a1} \cos \theta$, where $E_a$ is the effective line-to-neutral ac system voltage, $I_{a1}$ is the effective value of the fundamental frequency component of the ac system line current and $\theta$ is the angle by which the voltage $E_a$ leads the current $I_{a1}$ in time or phase position. If losses in the converter are negligible, then $P_{ac} = P_d$ and the unique matching capability of the converter (including reversibility) as an interface between the power system and the SESI is clearly established.

The effect of a commutating reactance $X_c$ corresponding to the transformer between a power system and the bridge is to introduce a time delay interval or overlap angle in the commutation process. Equation (1) is modified to become $$E_d = E_{av} = E_{do} \cos \alpha - I_d X_c \qquad (2)$$

Normally the product term $I_d X_c$ will be less than 20% of $E_{do}$. However, it cannot be neglected generally speaking.

Converter bridges can be connected in series to obtain a higher voltage $E_d$ or in parallel to obtain a higher current $I_d$. For best efficiency, bridges should be operated at or near maximum rating during the total charge-discharge cycle, which requires switching from the series, low $I_d$, connection to the parallel, high $I_d$, connection during use.

Results of our system analyses reveal excellent dynamic performance of such power system components. Certain harmonic voltages can be eliminated by proper design using well established techniques for either series or parallel bridges. For example, a twelve pulse bridge automatically eliminates the sixth harmonic and tuned filters can eliminate other undesirable voltages.

Large superconducting magnets are disclosed in the following publications:

Report entitled "THE 1.8 TESLA, 4.8-M ID BUBBLE CHAMBER MAGNET," Argonne National Laboratory, June, 1968, ANL/HEP 6811, describing a superconducting magnet having an energy storage capacity of $80 \times 10^6$ Joules.

Report entitled "THE SUPERCONDUCTING MAGNET SYSTEM FOR THE 12-FOOT BUBBLE CHAMBER", Argonne National Laboratory, June, 1968, ANL/HEP 6813, describing a superconducting magnet having an energy storage capacity of $80 \times 10^6$ Joules.

Article entitled "State-of-the-art of superconducting magnets" by M. S. Lubell, CRYOGENICS, October, 1972, pp. 340-355, describing superconducting magnets having energy storage capacities of 64 MJ (Megajoules), 80 MJ and 830 MJ. Report entitled "SUPERCONDUCTING MAGNET FOR THE 15 FOOT NAL BUBBLE CHAMBER", Argonne National Laboratory, February 1973, ANL/HEP 7215, describing a superconducting magnet having an energy storage capacity of 396 MJ.

We claim:

1. An energy storage and recovery device, comprising a superconducting magnet including a coil having a conductor made of a superconductive material, refrigeration means for maintaining said conductor of said coil in a superconductive state, reversible alternating-direct current converter means having a direct current interface connected to said coil of said superconducting magnet, said converter means having an alternating current interface including three lines for connection to a three phase alternating current power system, said converter means including an inverter-rectifier system having a plurality of controlled rectifiers connected between said alternating current interface and said direct current interface, and control means including a variable firing angle controller connected between said alternating current interface and said controlled rectifiers to fire said rectifiers with variable phase angle signals, said control means thereby being operative to adjust said converter means between an alternating-to-direct current conversion mode, in which energy derived from said alternating current power system causes the buildup of a direct current in said coil so that such energy is stored in said super-conducting magnet, and a direct-to-alternating current conversion mode in which the direct current in said coil is converted into alternating current which is returned to said power system so that energy is recovered from said superconducting magnet and returned to said power system.

2. A device according to claim 1, in which said rectifiers take the form of solid state controlled rectifiers.

3. A device according to claim 1, in which said rectifiers take the form of thyristors.

4. A device according to claim 1, said rectifier-inverter system comprising at least six of said controlled rectifiers connected between said direct current interface and said three lines.

5. A device according to claim 1, including a selectively operable shorting switch across said magnet coil to produce circulation of the direct current in said coil.

6. An energy storage and recovery device, comprising a superconducting magnet including a coil having a conductor made of a superconductive material, refrigeration means for maintaining aid conductor of said coil in a superconductive state, reversible alternating-direct current converter means having a direct current interface connected to said coil of said superconducting magnet, said converter means having an alternating current interface including three lines for connection to a three phase alternating current power system, said converter means including an inverter-rectifier system having a plurality of controlled rectifiers connected between said alternating current interface and said direct current interface, and control means including a variable firing angle controller connected between said alternating current interface and said controlled rectifiers to fire said rectifiers with variable phase angle signals which are variable in phase angle from 0° to approximately 180°, said control means thereby being operative to vary said phase angle and thereby to adjust said converter means between an alternating-to-direct current conversion mode, in which energy derived from said alternating current power system causes the buildup of a direct current in said coil so that such energy is stored in said superconducting magnet, and a direct-to-alternating current conversion mode in which the direct current in said coil is converted into alternating current which is returned to said power system so that energy is recovered from said superconducting magnet and returned to said power system, said control means also being operative by varying said phase angle to vary the rate at which the energy is recovered from said coil and returned to said power system.

* * * * *

UNITED STATES PATENT OFFICE
CERTIFICATE OF CORRECTION

Patent No. 4,122,512                    Dated  Oct. 24, 1978

Inventor(s) Harold A. Peterson and Roger W. Boom

It is certified that error appears in the above-identified patent and that said Letters Patent are hereby corrected as shown below:

Column 7, line 56, "the" should be --with--

Column 8, line 8, "$S_2$" should be --$S_w$--

Column 8, line 61, after "angle." insert --The average bridge output voltage decreases to zero at--

Signed and Sealed this

Twenty-seventh Day of February 1979

[SEAL]

Attest:

RUTH C. MASON
Attesting Officer

DONALD W. BANNER
Commissioner of Patents and Trademarks